(12) United States Patent
Gauthier et al.

(10) Patent No.: US 8,564,419 B2
(45) Date of Patent: Oct. 22, 2013

(54) WAKE-UP CONTROL SYSTEM AND METHOD FOR CONTROLLING RECEIVER WAKE-UP

(75) Inventors: Laurent Gauthier, Toulouse (FR); Christophe Landez, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 377 days.

(21) Appl. No.: 13/063,679

(22) PCT Filed: Sep. 19, 2008

(86) PCT No.: PCT/IB2008/055618
§ 371 (c)(1), (2), (4) Date: Mar. 11, 2011

(87) PCT Pub. No.: WO2010/032091
PCT Pub. Date: Mar. 25, 2010

(65) Prior Publication Data
US 2011/0158303 A1 Jun. 30, 2011

(51) Int. Cl.
*G08C 19/16* (2006.01)
(52) U.S. Cl.
USPC ...................................... 340/12.26
(58) Field of Classification Search
USPC ........... 340/12.26, 10.31, 10.32, 10.33, 10.34
See application file for complete search history.

(56) References Cited

U.S. PATENT DOCUMENTS

| | | | |
|---|---|---|---|
| 5,525,992 A | 6/1996 | Froschermeier | |
| 5,621,412 A | 4/1997 | Sharpe et al. | |
| 7,209,030 B2 | 4/2007 | Nolan et al. | |
| 7,952,464 B2* | 5/2011 | Nikitin et al. | 340/10.1 |
| 2003/0162496 A1* | 8/2003 | Liu | 455/11.1 |
| 2005/0046546 A1 | 3/2005 | Masudaya | |
| 2005/0237160 A1 | 10/2005 | Nolan et al. | |
| 2005/0237220 A1 | 10/2005 | Nolan et al. | |

FOREIGN PATENT DOCUMENTS

DE 19832203 A1 1/2000

OTHER PUBLICATIONS

International Search Report and Written Opinion correlating to PCT/IB2008/055618 dated Jul. 7, 2009.

* cited by examiner

*Primary Examiner* — Vernal Brown

(57) ABSTRACT

A wake-up control system comprises a plurality of different signal analyzer units. The plurality of different signal analyzer units may process a value of a different parameter of an incoming signal received at an input of a receiver and provide a false wake-up indication for the parameter when the value of the parameter is outside an acceptance range for the value. The system further comprises an evaluation unit connected to the plurality of different signal analyzer units for receiving the false wake-up indications. The evaluation unit may provide a false wake-up parameter information identifying an identified parameter of the different parameters when a sum of the false wake-up indications is outside an occurrence range for the false wake-up indications for the identified parameter.

20 Claims, 7 Drawing Sheets

WAKE-UP CONTROL SYSTEM AND METHOD FOR CONTROLLING RECEIVER WAKE-UP

FIELD OF THE INVENTION

This invention in general relates to communication systems, and more specifically to a wake-up control system and a method for controlling receiver wake-up.

BACKGROUND OF THE INVENTION

Managing and controlling power consumption is a key task for low power applications relying on a limited power supply, such as battery powered applications. Communication systems using battery powered equipment may switch the equipment from an active or ON mode to a standby or OFF mode with reduced functionality and reduced power consumption. For example, receivers in low power applications such as radio receivers used in e.g. mobile phones or automotive applications, such as passive entry systems or tire pressure monitoring systems, are often automatically switched to a standby mode with reduced power consumption, since data are not received as a continuous signal stream but occasionally in bursts between idle periods. In order to switch the receiver device back to active mode, where complete receiver functionality is available, a wake-up procedure is performed. A receiver cyclically changes between OFF mode and ON mode. FIG. 1 shows a schematic diagram of a first example 10 of a power consumption P over time t of a receiver switching between ON phases 12, 14 and OFF phases 16, 18, 20. When switching to ON mode, the receiver checks, if a signal is being received and a wake-up must be performed.

Moreover, FIG. 2 shows a schematic diagram of a second example 22 illustrating that in order to consume as little power as possible, wake-up is often performed as a power up sequence with several steps to detect an incoming signal and activate functions when needed. Checks for detecting a valid incoming signal are performed progressively or successively. With each further step, checks become more and more stringent, which often requires more complex and thus more power consuming analysis functionality, as the probability of receiving a valid incoming signal increases. If a valid signal is received, the step sequence goes up to completion and the received message is sent to a buffer for further processing by a data processing device. In a receiver system, this may, for example, be a microcontroller unit (MCU), a digital signal processor (DSP), a general purpose processor (GPP), a central processing unit (CPU) etc. FIG. 3 shows a schematic diagram of a third example 24 of a power consumption P over time t of a receiver switching between ON phases 12, 14 and OFF phases 16, 18, 20. As illustrated in FIG. 3, power consumption P over time t can be reduced by terminating the power up step sequence after the first detection level 26, 28 and switching back to OFF mode 18, 20, in case no signal is received. However, as illustrated in FIG. 4 showing a schematic diagram of a fourth example 30, in case of interference or other unwanted or invalid signals, the power up sequence may not be terminated immediately but may continue for some additional steps 30, 31 or even all of the steps of the sequence. In contrast to a complete valid wake-up, where all steps of the wake-up sequence are performed and the receiver finally provides fully activated functionality and receives a valid incoming signal, no valid signal is received during a false wake-up. If the false wake-up is detected before completion of the full wake-up procedure, the wake-up may be terminated before completion. These false wake-ups cause power consumption above the actually required minimum, since more sub-modules of the receiver need to be active during a longer time. In case of permanent interference, numerous false wake-ups can lead to a fast discharge of the battery powering the receiver.

SUMMARY OF THE INVENTION

The present invention provides a wake-up control system and a method for controlling receiver wake-up as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 5:
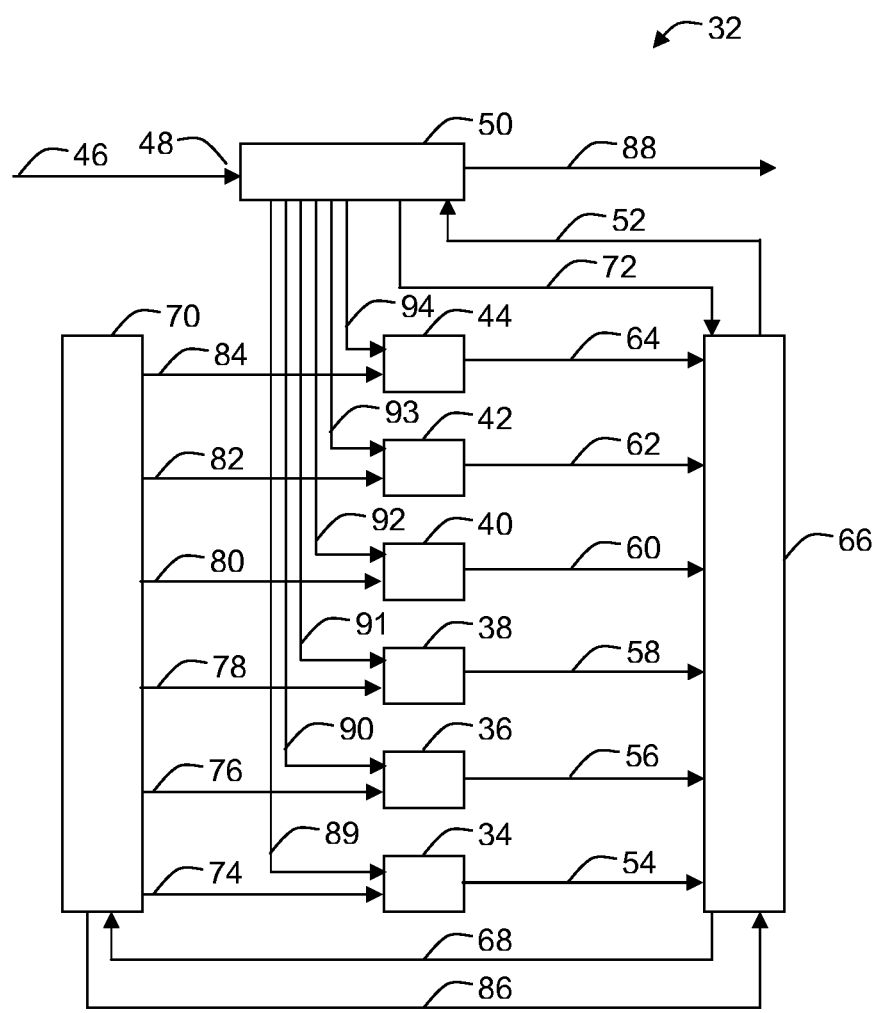
FIG. 5 schematically shows a block diagram of an example of an embodiment of a wake-up control system.

Referring to FIG. 5, a schematic block diagram of an example of an embodiment 32 of a wake-up control system is shown, comprising a plurality of different signal analyzer units 34-44, each of the plurality of different signal analyzer units being operable to process a value of a different parameter of an incoming signal 46 received at an input 48 of a receiver 50 and to provide a false wake-up indication 54-64 for the parameter, if the value of the parameter exceeds an acceptance level of the value; and an evaluation unit 66 connected to the plurality of different signal analyzer units, receiving each of the false wake-up indications and providing a false wake-up parameter information 68 identifying one of the different parameters to a controller unit 70, if a sum of the false wake-up indications for the one of the different parameters exceeds an occurrence level of the false wake-up indications for the one of the different parameters.

The illustrated wake-up control system may reduce average power consumption of a low power receiver. For example, it may terminate a wake-up sequence after detecting a false wake-up, thereby avoiding performing a full wake-up sequence and accordingly power consumption may be reduced.

The receiver may for example initially be in a standby- or OFF mode, with minimum power consumption. The receiver in standby mode then switches to active or ON mode and performs a wake-up procedure and determines whether a valid incoming signal is being received at an input of the receiver, e.g. whether the signal at the receiver input when a new wake-up test is initiated is a valid signal. The receiver may switch between OFF and ON mode and initiate a wake-up procedure for changing from reduced to full functionality, if a valid incoming signal is being received, in a cyclic process. However, the receiver may also be triggered to transition from OFF mode to ON mode in a different manner.

The incoming signal may be any time-varying quantity sensed at the receiver input, which varies in time due to information transmission from a sender to the receiver. The incoming signal 46 may for example be a new signal sent by a different sender than a previously received signal, or a new signal sent by the same sender as before, or the same signal as a previous signal received during a previous wake-up test.

The wake-up procedure is only performed completely when a valid signal is detected. Otherwise the system switches back to OFF mode. An information signal 52 which indicates whether or not the wake-up procedure should be terminated before completion may be sent to the receiver module 50 by the evaluation unit 66. With information signal 52, a wake-up procedure of the receiver that, for example, started periodically depending on an internal timer, may be aborted, and activation of all stages of the receiver may be stopped, before completion. When the wake-up procedure has been performed completely, received data 88 may be provided e.g. to processing devices for further processing.

Figure 1:
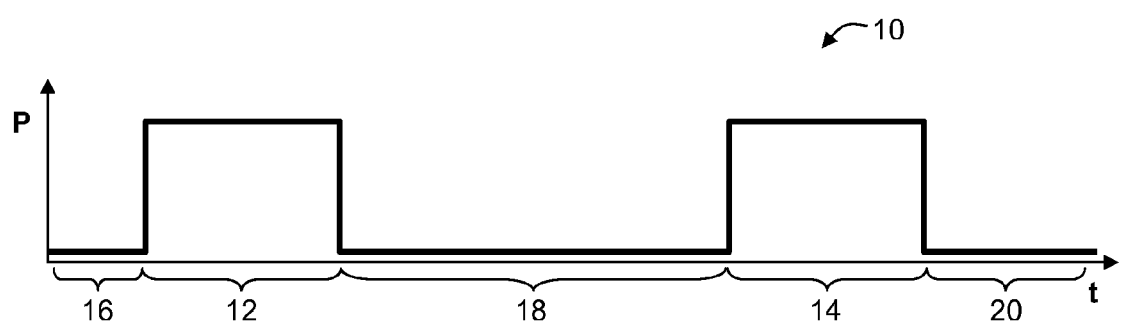
FIG. 1 shows a schematic diagram of a first example of a power consumption P vs. time t of a receiver cyclically switching between ON and OFF mode.
Figure 2:
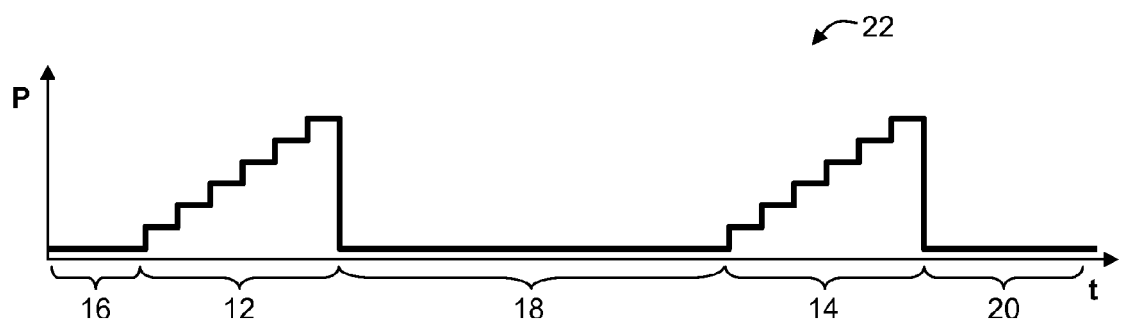
FIG. 2 shows a schematic diagram of a second example of a power consumption P vs. time t of a receiver cyclically switching between ON and OFF mode.
Figure 3:
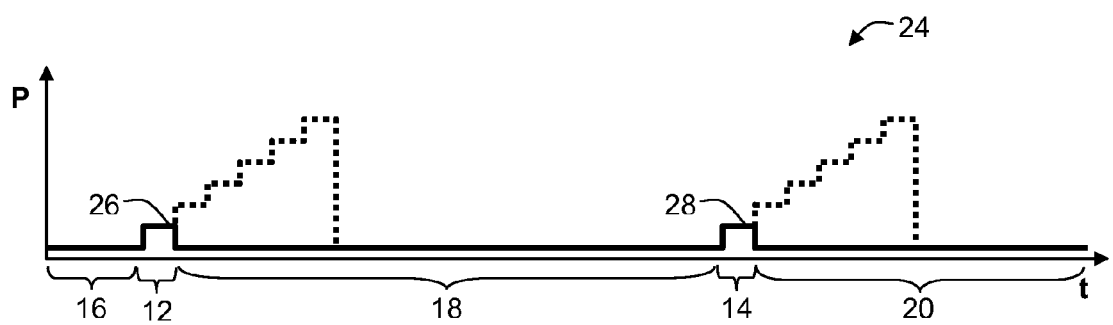
FIG. 3 shows a schematic diagram of a third example of a power consumption P vs. time t of a receiver cyclically switching between ON and OFF mode.
Figure 4:
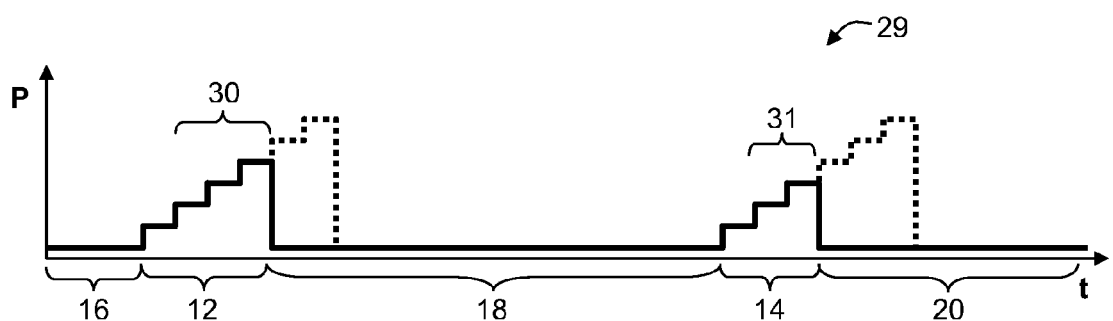
FIG. 4 shows a schematic diagram of a fourth example of a power consumption P vs. time t of a receiver cyclically switching between ON and OFF mode.

The shown example of a wake-up control system may analyze different parameters of the signal using different signal analyzer units or sub-modules detecting different indications of false wake-up. If an ongoing wake-up procedure is identified to be a false wake-up, a false wake-up indication 54-64 is generated by the respective signal analyzer unit 34-44 that detected the false wake-up. The respective false wake-up indication is provided to the evaluation unit 66. Although in FIG. 4, six analyzer units are shown, it will be apparent that a different number of analyzers may be used and that the number of signal analyzer units may depend on the number of different parameters analyzed.

Each signal analyzer unit receives a signal 89-94 from the receiver conveying a value of a different parameter of the current incoming signal 46 extracted by the receiver. A signal analyzer unit may receive a signal 89-94, extract a value of a parameter of the signal and provide a false wake-up indication 54-64 if the extracted parameter value is outside an acceptance range, for example is greater than, i.e. exceeds, an acceptance threshold level for the respective parameter value. In the shown example, the signal analyzer units are implemented as separate units however, the signal analyzers may alternatively be implemented as respective sub-modules of a signal analyzer main module performing some or all of the required analysis of extracted values of more than one parameter.

A plurality of parameters of an incoming signal may be used to determine whether an incoming signal is a valid signal or an interfering signal causing a false wake-up. Hence, the construction of receiver and signal analyzer unit depend on the signal parameter to be analyzed. A signal analyzer unit may for example comprise of a comparator circuit for comparison with a threshold value or may contain more complex circuits. A signal analyzer unit, as well as an evaluation unit, may be implemented as an electronic circuit comprising electric and electronic devices and may at least partly be implemented as an integrated circuit.

Signal parameter found to be suitable for indicating a false wake-up have found to be, for example a signal amplitude, a signal power, a signal-to-noise-ratio, a frequency of a carrier signal, and for digital communication systems, also for example, a clock of a modulation of the incoming signal, a specific bit pattern of a frame identification or of a header information of a frame to process, a bit error rate or symbol error rate. However, it will be apparent that other parameters could be used as well.

Evaluation unit 66 and signal analyzer units 34-44 may be implemented separately or together in the same device or as a part of the receiver module itself. The evaluation unit collects the false wake-up indications of each analyzed parameter generated by the signal analyzer units and determines, if any parameter delivered more false wake-up indications than a corresponding threshold value, i.e. a corresponding occurrence level. The evaluation unit may comprise a plurality of counters for some or all of the plurality of signal analyzer units operable to send false wake-up indications to the evaluation unit. On reception of a false wake-up indication, the corresponding counter may be incremented. Other embodiments of the evaluation unit may decrement counters or may apply other means for storing the number of false wake-up indications related to an incoming signal parameter. Therefore, the term "sum" may also comprise a difference or the result of any other mathematical operation for obtaining a measure for the number of false wake-up indications.

The evaluation unit 66 may also receive a wake-up indication 72 each time the receiver switches from OFF mode to ON mode and a new wake-up procedure is started by the wake-up system 32, i.e. the wake-up system 32 begins checking the incoming signal input 48 of the receiver module 50 for a presence of a valid incoming signal. This may allow the evaluation unit 66 to determine a false wake-up rate depending on the number of false wake-up indications and wake-up indications for any or all of the signal parameters monitored using the signal analyzer units.

The evaluation unit may for example determine the false wake-up rates after a fixed number of wake-up indications 72 were received. False wake-up rates may be determined depending on a sum of the false wake-up indications and a sum of the wake-up indications. Hence, this may be a ratio of the number of false wake-up indications 54-64 and the number of wake-up indications 72.

However, since false wake-up rates may be determined after a fixed number of wake-up indications have been received, determination of false wake-up rates may also be implemented using a wake-up indication counter and counters being incremented (or decremented) whenever a corresponding false wake-up indication is received and being evaluated whenever the wake-up indication counter reaches a predefined fixed verification threshold. Therefore, the false wake-up rate for one or more of the analyzed parameters may be determined, when the sum of the wake-up indications equals a verification threshold.

The dedicated occurrence level for a false wake-up rate may be the same for all determined false wake-up rates. It is also within the scope of the described system, that the information may be generated from a combination of more than one false wake-up rates. If a number of false wake-up indications or a false wake-up rate exceeds a dedicated occurrence level, a false wake-up parameter information 68 is generated and sent to a controller unit 70 connected to the evaluation unit 66. Exceeding an acceptance level or an occurrence level may comprise comparing with a maximum acceptance or occurrence level. However, it may also comprise comparison with a minimum level and comparing, whether or not a value lies within an acceptance range.

The wake-up system may adjust parameters dynamically in order to reduce the number of false wake-ups. For example, the controller unit may reduce receiver sensitivity in response to receiving the information. The false wake-up parameter information 68 provided to the controller unit 70 if at least one of the occurrence levels of the false wake-up indications corresponding to the different parameters is exceeded, may comprise an interrupt signal in which case the reduction of the receiver sensitivity may e.g. be triggered by the interrupt signal. However, the controller unit 70 may also be connected to the signal analyzer units 34-44 and the evaluation unit 66 and the controller unit 70 may be operable to modify the acceptance levels and/or the occurrence levels depending on the wake-up parameter information 68.

In addition to the information that an unacceptable number of false wake-up indications occurred, the false wake-up parameter information 68 may comprise additional information allowing to determine which of the signal analyzer units 34-44 has detected an unacceptable number of false wake-ups. This additional information may for example be provided to the controller unit via a status register containing status entries for some or all of the counters corresponding to the different wake-up indications counted. For example, the status register may contain a logical "1" for the entries corresponding to the signal analyzers which caused the false wake-up alarm and logical "0" for the other entries. However, other information, such as the actual count reading, may be provided as well.

Instead of reading a status register, the control unit 70 may receive the additional information in one or more messages sent by the evaluation unit 66. Depending on the false wake-up parameter information 68, the control unit 70 may then selectively adjust the acceptance level of the corresponding signal analyzer unit using corresponding connection 74-84 or the occurrence level using corresponding connection 86. Hence, the controller 70 may reduce power consumption of the wake-up control system after receiving the false wake-up parameter information provided by the evaluation unit 66 and may achieve an optimum, or at least improved, average reduction of power consumption as well as an improved accuracy of false wake-up detection and reduced incorrect rejections of valid incoming signals.

The controller unit 70 may be implemented in any manner suitable for the specific implementation, such as for example a suitably programmed microcontroller unit (MCU). However, it may be any other suitable device operable to perform controller functionality, such as other processing devices, e.g. a Central Processing Unit or a Programmable Logic Device, such as a Field Programmable Gate Array, Application Specific Integrated Circuit or other suitable device.

The receiver 50 may generate the extracted parameter signals from the incoming signal, send them to the analyzer units 34-44 and the analyzer units 34-44 may start to analyze the extracted parameter signals at the same time. However, parameter signals 89-94 may be extracted from the incoming signal by the receiver and sent to the signal analyzer units one after another. Thereby, the overall power consumption may be reduced.

The analyzer units 34-44 may progressively analyze the incoming signal 46. Parameter signal extraction of the receiver and/or analysis of the extracted signals by the signal analyzer units may for example be organised in stages ordered by power consumption. For example stages with lower computational requirements for parameter signal extraction and/or analysis, may be performed first while stages with increased computational effort may be performed later. Thereby, power efficiency of the system 32 may be improved.

For example, a detection of a level of any signal may require almost no digital processing (and accordingly have a relatively low power consumption), whereas the detection of a frequency of a signal may involve using some counters (and accordingly consume more power than detecting the signal level), the detection of the clock of the modulation of the signal may involve more complex digital signal processing (and accordingly consume more power than the detection of the frequency), the detection of a specific identification pattern (ID) that identifies a frame to process may be a complex digital signal processing task (and accordingly consume more power than the detection of the clock), which may also be the case for detection of a header marking the beginning of useful data. Accordingly, processing incoming data consecutively as listed may optimize reduction of power consumption.

Still referring to FIG. 5, the analyzing of the incoming signal 46 may be terminated when one of the one or more signal analyzer units 34-44 generates a false wake-up indication 54-64. Therefore, it may be possible to stop receiver wake-up and reduce power consumption at the earliest possible stage of processing. However, in case no false wake-up indication occurs, the wake-up procedure completes the transition of the system to ON mode.

Figure 6:
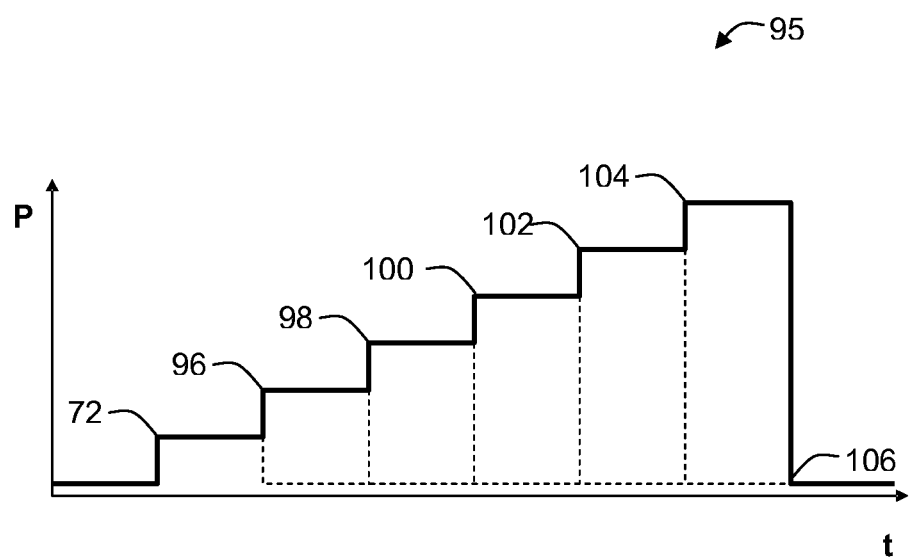
FIG. 6 shows a schematic diagram of an example of power consumption P vs. time t of a wake-up sequence.

Referring also to FIG. 6, a schematic diagram of power consumption P vs. time t of an example 95 of a wake-up sequence is illustrated, where consecutive signal analysis steps 96-106 ordered by the required power consumption are performed. No false wake-up is detected and the wake-up sequence is completed, allowing to receive 106 a valid signal.

However, if a first signal analyzer unit 34 detects a false wake-up at step 96 after a wake-up indication was received (as indicated with 72 in FIG. 6) and a wake-up counter may have been incremented, the first signal analyzer unit 34 may send a false wake-up indication to the evaluation unit 66. The evaluation unit 66 may in turn may increment a first counter and abort the shown wake-up sequence. Otherwise wake-up procedure may continue and a second signal analyzer unit 36 may detect a false wake-up at step 98 and may send a false wake-up indication to the evaluation unit. The evaluation unit 66 in turn may increment a second counter and abort the shown wake-up sequence. If the wake-up procedure is not aborted at any of steps 96-104, wake-up procedure is completed.

The operation of one or more of the signal analyzer units 54-64 may be disabled by the controller unit 70. This may help increase speed of analysis and reduce power consumption. For example, if a signal analyzer unit seldom detects a false wake-up, the analyzed parameter may not be able to provide a valuable information, e.g. due to prior optimization with respect to the analyzed parameter.

The wake-up system may adjust parameters dynamically in order to reduce the number of false wake-ups. For example, the controller unit 70 may reduce a sensitivity of a first signal analyzer unit 34 analyzing a level of the incoming signal 46. The signal level may, for example, be an amplitude or average power of the received signal. For example, if no signal is being received, a signal level at receiver input may be low. Here, counting false wake-up indications may be performed without counter, since this is the minimal wake up necessary to check if any signal is being received or not. False wake-ups due to low level signals may occur on a noisy channel. Furthermore, if for example a second analyzer unit receives a second parameter signal extracted from the low level incoming signal, it may encounter problems to analyze the second parameter signal, e.g. a carrier frequency of the incoming signal. This may be solved by reducing a sensitivity of the first signal analyzer unit and therefore enhancing the possibility of a generation of a false wake-up indication already by the first analyzer unit, which may cause evaluation unit 66 to send an information 52 to receiver 50 to abort wake-up and not activate remaining power consuming stages of the receiver.

Also, the controller unit 70 may reduce a frequency acceptation window of a second signal analyzer unit 36 detecting a frequency of the incoming signal. The size of a frequency acceptation window defines an acceptance range for deciding, whether or not a certain frequency has been detected in the incoming signal. If for example a third signal analyzer unit 38 analyzing a third parameter signal extracted from an incoming signal, for example for detection of a clock of the modulation of the incoming signal, often generates a false wake-up indication, the second analyzer stage 36 may have accepted erroneously received incoming signal frequencies as valid carrier frequencies. This may prohibit the third signal analyzer unit 38 to detect a valid clock signal of the modulation. Reducing the size of the frequency acceptation window may, for example, reduce acceptation of wrong carrier frequencies and therefore allow to abort wake-up before activating successive receiver or signal analyzer stages.

Furthermore, the controller unit 70 may reduce a clock recovery acceptation window of a third signal analyzer unit 38 detecting a clock of a modulation of the incoming signal. Reducing the clock recovery acceptation window increases probability of rejection of a signal having a wrong clock frequency before invalid bits are recovered due to application of an incorrect clock signal. Furthermore, this may enable an improved data analysis, for example by a fourth signal analyzer unit 40 analyzing an identification pattern identifying the beginning of a valid frame.

Also, the controller unit 70 may increase a length of an identification pattern of a frame to process by a fourth signal analyzer unit 40 analyzing the identification pattern in the incoming signal. The identification pattern or ID is a bit sequence or word sent by a transmitter to identify the message being sent and to trigger waking up of the receiver. The receiver may decode a small part of the ID, for example, 2 to 6 bits, to allow fast recognition and to optimize a compromise between time to decode, which is directly related to required power consumption, i.e. decoding more bits may consume more power, and false wake up due to wrong ID that may also relate to power over-consumption, since each false wake-up unnecessarily consumes power. Thus, if a minimal ID decoding leads to false wake-up, increasing the size of the ID the receiver considers for decoding may reduce the number of false wake-ups and may lead to lower overall consumption of power. If an identification pattern belonging to an invalid frame is accepted by a fourth analyzer unit 40, a fifth analyzer unit 42 may fail to detect a frame header marking a beginning of useful data when decoding an invalid signal. Increasing the decoded ID length may increase probability of rejection of an invalid signal before trying to decode the payload.

The controller unit 70 also may increase a sensitivity or to increase a data recovery acceptation window of any of said plurality of analyzer units 34-44. If for example a sixth signal analyzer unit 44 encounters problems with detecting a specific header marking the beginning of useful data, the bits of the frame recovered from the incoming signal may be wrong. Increasing sensitivity of a preceding signal analyzer unit may help detection of a wrong frame or improve recovery of bits contained in the signal. Increasing a data recovery acceptation window of a previous signal analyzer stage may help avoid wrong rejection of valid data.

A stop when sending received data to a processing unit, e.g. the controller unit used by the wake-up system or any other processing unit, for subsequent further processing may be caused by a frame decoding error (interference, noise or bad decoding). In order to reduce these stops, the receiver belonging to the wake-up control system may be more tolerant on errors. Manchester decoding, for example, is done by measuring pulse width and comparing them to some threshold values. The controller unit may decrease a margin between a short and a long pulse, if jitter of the incoming signal is an important parameter indicating false wake-up due to reception of an invalid signal. A too strict decoding (small and long pulses being compared to narrow windows may lead to decoding errors) or very tolerant decoding (small and long pulses being compared to wide windows, upper limit of short pulse is allowed to equal lower limit of long pulse) may both lead to reduced performances. An optimum may be found given some information on the error itself.

Although the described embodiment of the wake-up system comprises analyzing received digital data signals, the system may as well be applied to receivers of analogous transmissions. Signal analyzer units may analyze signal power, SNR and other parameters characterizing an analogous signal.

The transmission channel the receiver is listening to may be a wired or a wireless transmission channel. Many applications using a low power consumption receiver do not have permanent connection to an electricity network, but are autonomous, having a stand-alone power supply, such as a battery. Furthermore, such an application may communicate with other entities through a wireless communication network. Therefore, the receiver 50 may be a radio receiver. However, wireless communication channels are subject to a variety of errors, such as noise and interference by unwanted signals, which may cause frequent false wake-ups of the receiver. This may result in power over-consumption and fast discharge of the battery, which may cause a failure of the system.

Figure 7:
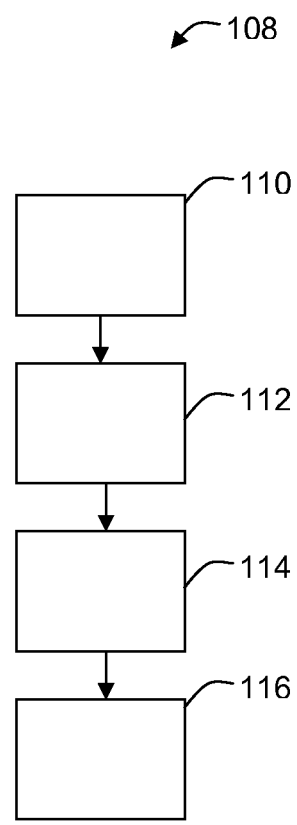
FIG. 7 schematically shows a flow diagram of an example of a first embodiment of a method for controlling receiver wake-up.

Referring now also to FIG. 7, a flow diagram of an example of a first embodiment 108 of a method for controlling receiver wake-up is illustrated. The shown method for controlling a receiver wake-up comprises each of a plurality of different signal analyzer units 34-44 processing 110 a value of a different parameter of an incoming signal 46 received at an input 48 of a receiver 50 and providing 112 a false wake-up indication 54-64 for the parameter, if the value of the parameter exceeds an acceptance level of the value; and receiving 114 each of the false wake-up indications by an evaluation unit 66 and providing 116 a false wake-up parameter information 68 identifying one of the different parameters to a controller unit 70, if a sum of the false wake-up indications for the one of the different parameters exceeds an occurrence level of the false wake-up indications for the one of the different parameters.

The step of receiving 114 each of the false wake-up indications by an evaluation unit may further comprise receiving a wake-up indication by the evaluation unit each time a wake-up procedure is started. And the step of providing 116 a false wake-up parameter information 68 identifying one of the different parameters to a controller unit 70 may also comprise modifying the acceptance levels and/or the occurrence levels by the controller unit depending on the wake-up parameter information. In an embodiment of the method, the analyzer units may progessively analyze the incoming signal. The step of receiving 114 each of the false wake-up indications by an evaluation unit 66 may comprise ending the analyzing of the incoming signal when one of the one or more analyzer units generates a false wake-up indication. And the step of providing 116 a false wake-up parameter information 68 identifying one of the different parameters to a controller unit 70 may comprise disabling operation of one or more of the signal analyzer units by the controller unit. Step 116 may also comprise reducing a sensitivity of a first signal analyzer unit 34 by the controller unit 70 detecting a level of the incoming signal 46. Furthermore, it may comprise the controller unit 70 reducing a frequency acceptation window of a second signal analyzer unit 36 analyzing a frequency of the incoming signal and/or reducing a clock recovery acceptation window of a third signal analyzer unit 38 analyzing a clock of a modulation of the incoming signal and/or increasing a length of an identification pattern of a frame to process by a fourth signal analyzer unit 40 analyzing the identification pattern in the incoming signal and/or increasing a sensitivity or increasing a data recovery acceptation window of any of the plurality of signal analyzer units.

The illustrated method allows implementing the advantages and characteristics of the described wake-up control system as part of a method for controlling a receiver wake-up. This also applies to the example of a second embodiment of the invented method described below.

Figure 8:
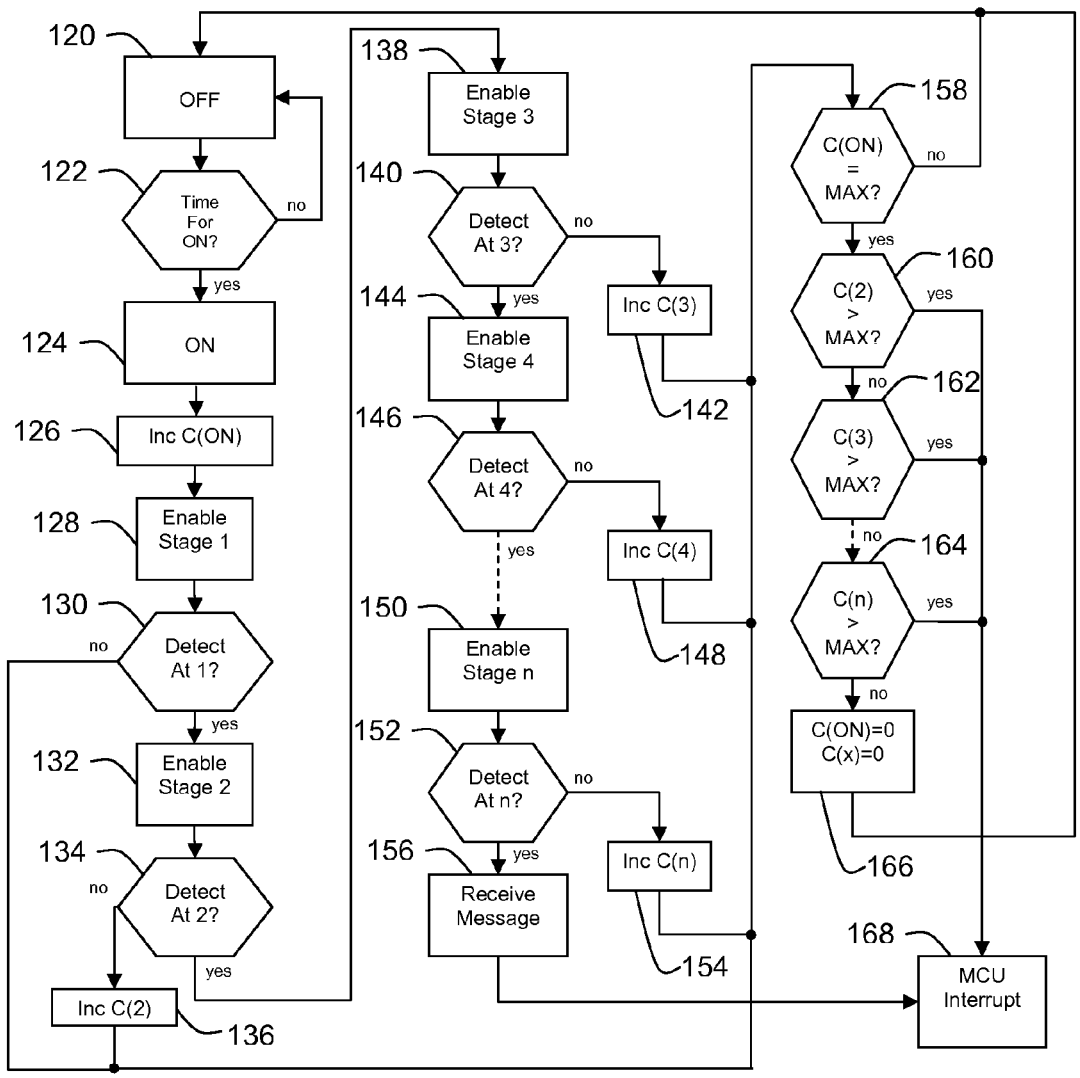
FIG. 8 schematically shows a flow diagram of an example of a second embodiment of a method for controlling receiver wake-up.

Referring now also to FIG. 8, a flow diagram of an example of a second embodiment 118 of a method for controlling receiver wake-up is shown. Starting in OFF mode 120, the method comprises switching a wake-up system to ON mode 124 and initiating a wake-up sequence after an OFF time or sleep time 122. A wake-up indication may be send to an evaluation unit incrementing a wake-up counter C(ON) 126. A first signal analyzer stage may then be enabled 128, analyzing a level of an incoming signal. If no valid signal is detected 130, further signal analysis may be skipped and the wake-up counter C(ON) may be evaluated 158. Otherwise, a second signal analyzer stage may then be enabled 132, sensing a carrier frequency of the incoming signal. If no valid frequency is detected 134, a false wake-up counter C(2) may be incremented 136, further signal analysis may be skipped and the wake-up counter C(ON) may be evaluated 158. Otherwise, a third signal analyzer stage may be enabled 138, sensing a modulation of the incoming signal. If no valid modulation is detected 140, a false wake-up counter C(3) may be incremented 142 and further signal analysis may be skipped and the wake-up counter C(ON) may be evaluated 158. Otherwise, a fourth signal analyzer stage may be enabled 144, sensing an identification pattern of the incoming signal. If no valid identification pattern is detected 146, a false wake-up counter C(4) may be incremented 148 and further signal analysis may be skipped and the wake-up counter C(ON) may be evaluated 158. Otherwise, a sequence of other signal analyzers stages may be enabled one after another, sensing different parameters of the incoming signal. For example, an n-th signal analyzer stage may be enabled 150, analyzing header information of the incoming signal. If no valid header information is detected 152, a false wake-up counter C(n) may be incremented 154 and the wake-up counter C(ON) may be evaluated 158. The evaluated signal parameters are examples, other parameters may be evaluated instead. If no signal analyzer stage detects a false wake-up, the valid signal containing a message may be received 156 and sent to a receiver buffer for further processing and an interrupt for a microcontroller unit (MCU) may be created 168, causing the MCU to initiate further processing of the received data. In case of a detection of a false wake-up, the wake-up counter C(ON) may be evaluated 158. If the number of wake-ups counted does not equal a verification threshold MAX, the wake-up sequence may end and the system may be switched back to OFF mode 120. Otherwise, false wake-up counter C(2) may be evaluated 160. If the number of false wake-ups counted due to too many out of band signals exceeds an occurrence level, an interrupt for the MCU may be generated 168, causing the MCU to selectively adjust false wake-up detection and/or evaluation criteria. Otherwise, false wake-up counter C(3) may be evaluated 162. If the number of false wake-ups counted due to too many wrong modulation signals exceeds an occurrence level, an interrupt for the MCU may be generated 168, causing the MCU to selectively adjust false wake-up detection and/or evaluation criteria. Otherwise, other false wake-up counters used, such as false wake-up counter C(n), may be evaluated. If the number of false wake-ups counted by C(n) due to too many signals containing wrong header information exceeds an occurrence level, an interrupt for the MCU may be generated 168, causing the MCU to selectively adjust false wake-up detection and/or evaluation criteria. The occurrence level used in step 160, 162, 164 may be MAX. However, different occurrence levels for different counters may be used. After evaluating all false wake-up counters, an MCU interrupt may have been generated 168. Otherwise, the system using the method may currently be perfectly tuned. Wake-up counter and false wake-up counters may be reset 166 and the system may be switched back to OFF mode 120.

Any mobile application, i.e. any application with at least having a mobile receiver, comprising or being part of a communication system may use a receiver wake-up system or implement a method as described above. For example, this may apply to mobile phones or other mobile devices connected to a mobile communication network, or laptops or other mobile computers or devices using wireless local area network (WLAN), or any automotive application. Therefore, an automotive application may comprise a wake-up system or may implement a method described above.

For example, an automotive application may be a tire pressure monitoring system (TPMS) or a remote keyless entry system (RKE) or passive entry solution (PE). A TPMS is an electronic system monitoring the air pressure inside the pneumatic tires of a vehicle. TPMS may be implemented using radio frequency technology, to avoid rotating contact wiring, together with an electronic control unit fitted inside the vehicle, which provides processing functionality to interpret pressure data coming from battery powered sensor transmitters at the tires. A TPMS may deliver alerts and warnings to the driver.

A remote keyless entry system is a system designed to remotely permit or deny access to premises or automobiles. In the case of automobiles, an RKE performs the functions of a standard car key without physical contact. Door locks can be locked or unlocked from several feet away. The passive entry (PE) may allow unlocking and starting a vehicle without actively using a key. The key is identified via a proximity sensor in the vehicle door and a radio pulse generator in the key housing when the driver approaches the vehicle. The vehicle is automatically unlocked as soon as the door handle or trunk lid is actuated.

Also for example, a receiver of a wireless body area network (WBAN) or a wireless personal area network (WPAN) may comprise a wake-up system or may implement a method described above. A WBAN consists of a set of mobile and compact intercommunicating sensors, either wearable or implanted into the human body, which monitor vital body parameters and movements. These devices, communicating through wireless technologies, transmit data from the body to a home base station, from where the data can be forwarded to a hospital, clinic or elsewhere. A wireless personal area network (WPAN) is a computer network used for communication among computer devices (including telephones and personal digital assistants) close to one person. Data exchange may, for example, rely on Bluetooth or ZigBee communication. The devices may or may not belong to the person in question. WPANs can be used for communication among the personal devices themselves (intrapersonal communication), or for connecting to a higher level network and the Internet.

Figure 9:
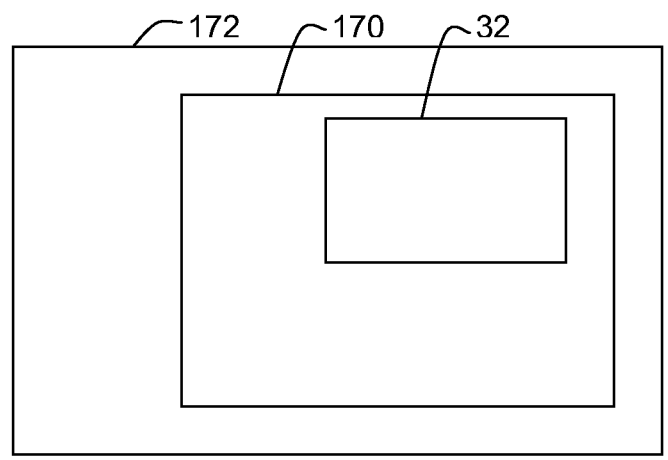
FIG. 9 schematically shows a block diagram of an example of a vehicle comprising an automotive application having a wake-up control system.

Referring now also to FIG. 9, a block diagram of an example of a vehicle 172 comprising an automotive application 170 having a wake-up control system 32 is shown. A vehicle 172 may comprise an automotive application 170 or a wake-up system 32 or may implement a method as described above. A vehicle may be a car. However, it may be any automotive apparatus, such as a plane, a ship, a helicopter etc.

Furthermore, a computer program product may comprise code portions for executing steps of a method or for implementing parts of a wake-up control system described above when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be apparent that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections. Also, at least portions of the system 32 may be implemented using a programmable logic device (PLD), e.g. a field programmable gate array (FPGA), an application specific integrated circuit (ASIC) etc., or as a program code executable by a processing device, such as a digital signal processor (DSP), a microcontroller unit (MCU), a general purpose processor (GPP), a central processing unit (CPU) etc.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 5 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 32, 90 are circuitry located on a single integrated circuit or within a same device. Alternatively, system 32, 90 may include any number of separate integrated circuits or separate devices interconnected with each other. For example, evaluation unit 66 may be located on a same integrated circuit as signal analyzer units 34-44 or on a separate integrated circuit or located within another peripheral discretely separate from other elements of system 32, 90. Also for example, system 32, 90 or portions thereof may be soft or code representations of physical circuitry or of logical representations convertible into physical circuitry. As such, system 32, 90 may be embodied in a hardware description language of any appropriate type.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A wake-up control system, comprising:
   a plurality of different signal analyzer units each operable to
     process a value of a different parameter of an incoming signal received at an input of a receiver and
     provide a false wake-up indication for said parameter when said value of said parameter is outside an acceptance range for said value; and
   an evaluation unit connected to said plurality of different signal analyzer units, said evaluation unit operable to receive each of said false wake-up indications, and
     provide a false wake-up parameter information identifying an identified parameter of said different parameters when a sum of said false wake-up indications is outside an occurrence range for said false wake-up indications for said identified parameter.

2. The wake-up control system as claimed in claim 1, wherein said evaluation unit is further operable to receive a wake-up indication each time a wake-up procedure is started.

3. The wake-up control system as claimed in claim 1 further comprising:
   a controller unit, coupled to each of said analyzer units, said controller unit is operable to modify one or more of said acceptance range and/or said occurrence range depending on said wake-up parameter information.

4. The wake-up control system as claimed in claim 1, wherein said analyzer units progressively analyze said incoming signal.

5. The wake-up control system as claimed in claim 4, wherein said progressive analyzing of said incoming signal ends when one of said one or more analyzer units generates a false wake-up indication.

6. The wake-up control system as claimed in claim 3, wherein operation of one or more of said signal analyzer units can be disabled by said controller unit.

7. The wake-up control system as claimed in claim 3, wherein said controller unit is further operable to reduce a sensitivity of a first signal analyzer unit analyzing a level of said incoming signal.

8. The wake-up control system as claimed in claim 3, wherein said controller unit is further operable to reduce a frequency acceptation window of a first signal analyzer unit detecting a frequency of said incoming signal.

9. The wake-up control system as claimed in claim 3, wherein said controller unit is further operable to reduce a clock recovery acceptation window of a first signal analyzer unit detecting a clock of a modulation of said incoming signal.

10. The wake-up control system as claimed in claim 3, wherein said controller unit is further operable to increase a length of an identification pattern of a frame to process by a first signal analyzer unit analyzing said identification pattern in said incoming signal.

11. The wake-up control system as claimed in claim 3, wherein said controller unit is further operable to increase a sensitivity or to increase a data recovery acceptation window of any of said plurality of signal analyzer units.

12. The wake-up control system as claimed in claim 1, wherein said receiver comprises a radio receiver.

13. An automotive application, comprising a wake-up system as claimed in claim 1.

14. A vehicle, comprising an automotive application as claimed in claim 13.

15. A method for controlling a receiver wake-up, the method comprising:
   processing, by each of a plurality of different signal analyzer units, a value of a different parameter of an incoming signal received at an input of a receiver; and
   providing a false wake-up parameter information identifying an identified parameter to a controller unit, wherein said providing comprises
     determining a number of times said value of said identified parameter is outside an acceptance range for said value,
     determining whether the number of times is outside an occurrence range, and
     performing said providing when the number of times is outside the occurrence range.

16. The method of claim 15 further comprising:
   modifying one or more of said acceptance range and said occurrence range in response to said wake-up parameter information.

17. The method of claim 15 further comprising:
   reducing a sensitivity of a first signal analyzer unit of the plurality of different signal analyzer units.

18. The method of claim 15 further comprising:
   reducing a frequency acceptation window of a first signal analyzer unit of the plurality of different signal analyzer units.

19. The method of claim 15 further comprising:
   reducing a clock recovery acceptation window of a first signal analyzer unit of the plurality of different signal analyzer units.

20. A non-transient computer-readable medium storing instructions executable by a processor, said instructions configured to:
- process different parameter values of an incoming signal received at an input of a receiver; and
- provide false wake-up parameter information identifying an identified parameter to a controller unit, wherein said instructions to provide further comprise instructions configured to
- determine a number of times said value of said identified parameter is outside an acceptance range for said value,
- determine whether the number of times is outside an occurrence range, and
- perform said providing when the number of times is outside the occurrence range.

* * * * *